United States Patent Office 3,185,651
Patented May 25, 1965

3,185,651
METHOD OF PREPARING AN ALUMINA-SUP-
PORTED CATALYST COMPOSITION AND THE
PRODUCT THEREOF
Robert Bosc, Maisons-Laffitte, and Paul Belon, Salindres,
France, assignors to Société Francaise des Produits Pour
Catalyse, Seine et Oise, France
No Drawing. Filed Apr. 3, 1961, Ser. No. 100,021
Claims priority, application France, Apr. 9, 1960, 823,926
6 Claims. (Cl. 252—463)

The present invention relates to the production of catalytic materials on an alumina basis, more particularly, to a process for producing such catalytic materials wherein the materials have both improved resistance to attrition and improved catalytic activity.

It is well-known to use alumina alone or in combination with other substances such as metals or metallic compounds and particularly metal oxides or sulfides, for carrying out various chemical reactions such as that of oxidation, hydrogenation, dehydrogenation, hydration, dehydration, cracking, reforming, hydrorefining and the like.

These catalytic materials are generally used in the form of conglomerates and, for example, as grains, granules, balls, pills, pellets, either by impregnating an already agglomerated alumina with a catalyst or a catalyst-generating substance, hereinafter designated by the term "precursor," or according to any conventional direct binding process of the catalyst constituents with alumina. Such binding processes may be accomplished by pressing, drawing, graining, moulding into pellets, forming pills, or by any similar treatment which, in most cases, occurs in the presence of water. This treatment is usually followed by an aging treatment in moist air under moderate temperature and with a convenient thermal treatment, which may comprise an activation of alumina and/or a chemical conversion of the precursor to the corresponding catalyst.

It has been observed that said conglomerates of alumina alone or with catalytic substances do not exhibit a sufficient resistance to attrition under certain conditions of use, and particularly when used in a moving bed.

It is therefore the object of this invention to provide a process which avoids these drawbacks of the presently known catalytic conglomerates on an alumina basis, by improving their resistance to attrition.

It is another object of this invention to improve the activity of the alumina-catalyst conglomerates.

These and other objects, as will be apparent from the following description and claims, are achieved according to this invention by submitting the powdered catalytic material, obtained by crushing said conglomerates, to a second treatment by agglomeration, aging and calicination, after eventual addition thereto of fresh catalyst constituents. The term "fresh catalyst constituents" relates to fresh alumina and eventually fresh catalytic substances themselves as well as to their precursors, the use of which is preferred according to this invention. The term "fresh catalyst constituents" refers to catalyst constituents which have not been subjected to calcination, i.e., heating to 300–700° C. The term "fresh alumina" relates to alumina precursors as well as alumina itself. These precursors may consist, in most cases, of acids, bases or preferably salts, which contain the metal(s) which it is desired to incorporate in the catalytic material. By way of example, such precursors may consist of salts of cobalt, nickel, iron or zinc which are converted by calcination to the corresponding oxides, the salts of polyacids such as vanadates, tungstates, molybdates or said acids or their anhydrides, the calcination of which provides the corresponding oxides, the thiomolybdates or thiotungstates of metals the calcination of which results in the formation of the corresponding sulfides, these various elements being used alone or in admixture to one another.

Such a process results in the re-agglomeration and treatment of a catalytic material already agglomerated and treated in a prior operation, and then used as a part or whole of the starting material for the manufacture of new conglomerates. At first sight, the advantages exhibited by said new conglomerates according to this invention would appear to be the result of the two successive complete treatments (a complete treatment consisting of an agglomeration and an aging treatment followed up by a thermal treatment) to which is submitted the starting material. Accordingly, it would seem more convenient to simplify this procedure by carrying out a single complete treatment having a lengthened duration corresponding to that of said two treatments. This is not, however, the case and such a lengthening of the duration of the treatment, even over a period substantially longer than that of the two aforesaid separate treatments cannot provide the advantages obtained according to this invention, as it has been demonstrated by comparative tests. It must be deduced therefrom that the intermediate agglomeration between the two treatments is an essential step in the process of this invention, the results achieved according to the latter being quite unexpected in view of the prior art.

Although the best results have been obtained by crushing the conglomerates prior to their treatment according to this invention, it may suffice, in some cases, to use the small particles of catalytic matter resulting from the attrition effect between said conglomerates and particularly during the thermal treatment(s) of the same.

It is noted that the size of the grains of catalytic material which are submitted to the agglomeration treatment is not critical. For example, grains of alumina of the eta type may be used having a diameter within the range of from one tenth of a micron to one millimeter. Nevertheless, grains of a size outside that range may also be convenient in some particular cases.

The binding of the alumina powder with the catalyst is relatively easy to carry out depending on the nature of the alumina used. Thus, eta alumina or any form of alumina, such as alumina gels, which are susceptible to being converted to eta alumina by means of a thermal treatment, as well as alumina of similar types, are particularly convenient and are preferred according to this invention.

In the case where water is used either for agglomerating the alumina and the catalyst elements to form conventional conglomerates or for re-agglomerating crushed conglomerates according to this invention, the amount of water is advantageously less than 200 percent of the weight of alumina and preferably in the range of from 30 to 100 percent by weight of the alumina. Higher proportions of water are preferably used in association with alumina of high porosity. However, these limits are not to be considered as limitative of the scope of this invention since proportions of water outside of the preferred range may also be used. In this case the binding is more difficult to carry out and less homogeneous. This results in the production of a more friable catalyst of lower efficiency.

In certain cases, for example when the conglomerates are made in the form of tablets, it is preferable to avoid the use of water.

The binding operation either for a first agglomeration or for a re-agglomeration according to this invention is advantageously completed by an aging treatment consisting of maintaining the obtained conglomerates in moderately moist air under relatively low temperature, for instance lower than 150° C., for a period which may advantageously range from one hour to one month and preferably between 5 and 100 hours. These limits, however, are not critical. After such a treatment, the conglomerates may be subjected to a thermal treatment for activation of the alumina and for converting the precursors to the corresponding catalytic matters, said thermal treatment being carried out in most cases at a temperature in the range of from 300° C. to 700° C. Prior to or after said thermal treatment, a convenient complementary treatment may be carried out. For example, this treatment may be a reduction by hydrogen for converting metallic salts to their lower oxides or even to the corresponding metals, particularly when the latter are palladium or platinum.

The proportion by weight of catalytic matter resulting from prior treatments of agglomeration, aging and thermal activation is advantageously at least 0.5 percent of the total weight of dried catalyst components which are to be submitted to a further agglomerating treatment according to this invention.

In fact, a lower proportion of said catalytic matter would be insufficient for substantially reducing attrition of the conglomerates and eventually for increasing their catalytic activity. The optimum proportion determined with consideration to both economical and technical conditions is, in most cases, between 2 and 50 percent, although this latter proportion might be exceeded.

The advantages resulting from the carrying-out of this invention are still obtainable to a substantial extent even when submitting a catalytic material which has been already subjected to agglomeration, aging and thermal activating treatments to a second series of similar treatments, in the absence of fresh catalyst constituents. In this latter case, however, said advantages are comparatively lower and the total cost of the operation is increased as compared with conditions wherein the proportion by weight of catalytic material already submitted to agglomeration and to aging and thermal treatments used in admixture with fresh constituents, relative to the total amount of the dried constituents, in the final catalytic material is between 2 and 50 percent.

In view of the very wide potential field of application of the present process for reducing attrition of the catalytic conglomerates having an alumina basis, which process may be carried out independently from the nature of the catalytic substances or precursors added to the alumina, it is unnecessary to describe more in detail each particular case. The following examples, which are not to be taken as in any way limiting the scope of this invention, are illustrative of this invention.

*Example I*

A granulated catalytic material consisting of cobalt molybdate is prepared from a catalytic mixture consisting of 20 kilograms of eta alumina obtained by rapid dehydration into a gaseous stream, at a temperature of about 700° C., of hydrargillite obtained according to the Bayer's process, having added thereto 4 kilograms of ammonium paramolybdate and 2.4 kilograms of hexahydrated cobalt nitrate so as to obtain a homogeneous mixture of particles having a size in the range of 1 to 100 microns.

To said catalytic mixture are progressively added 8.5 kilograms of distilled water and the whole resulting mass is stirred up so as to result in a homogeneous paste. This paste is drawn through a drawing plate of a diameter of 2 millimeters and the so formed thread is cut into pieces about 5 millimeters long. The so obtained granules are maintained in moist air for 12 hours at a temperature of 70° C. and thereafter dried by means of a stream of dry and hot air while progressively increasing the temperature from 70° C. to 110° C. Finally, they are calcinated by heating to a temperature of 590° C. for one hour.

The test used for determining the attrition properties of said catalyst was carried out in a substantially cylindrical receptacle of stainless steel having an inner diameter of 3.5 centimeters and a height of 8 centimeters, with its longitudinal axis substantially vertical. 10 grams of the catalytic material are introduced into said receptacle which is then subjected for 10 minutes to alternative upward and downward movements having an amplitude of 4 millimeters, at a frequency of 1,440 movements per minute. The receptacle is then emptied and its contents are passed through a sieve having a mesh width equal to one half of the smallest dimension of the initial catalyst (i.e. 1 mm. in the present case).

The attrition is measured by the weight percent of the particles passing through the sieve. In the present case it is 8.6 percent.

The catalytic activity is measured by the desulfurization percent of a "gas-oil" corresponding to a distillation cut having a boiling temperature range of from 210 to 350° C. of crude Iraq petroleum, the initial sulfur content of said cut amounting to 0.83 percent, said desulfurization being carried out in the presence of 2 grams of catalyst over a period of 3 hours at a temperature of 400° C. and under a hydrogen pressure of 50 atmospheres.

In the present case the catalytic activity, thus defined, amounts to 72 percent. A lengthening of the duration of the step of making granules as well as of the aging and/or calcination treatments does not provide for any change in the attrition and catalytic activity of resulting granulated catalytic material.

*Example II*

Example I is repeated except that the mixing and drawing are replaced by a binding of the catalyst components in the form of pills. There is thus obtained the final catalytic material in the form of balls having a diameter of from 3 to 5 millimeters. Attrition amounts to 1.5 percent and the catalytic activity to 60 percent. A lengthening of the duration of the steps of pill-forming, aging and/or calcination do not result in any improvement in the results obtained.

*Example III*

A catalytic material is prepared by pulverizing 10 kilograms of the catalytic material obtained according to Example I, admixing the resulting powder to 10 kilograms of activated eta alumina, 2 kilograms of ammonium paramolybdate, 1.2 kilograms of hexahydrated cobalt nitrate and 8.5 kilograms of distilled water, and treating the so obtained mixture in the same manner as according to Example I.

The attrition of this catalyst amounts to 3.5 percent and its catalytic activity to 74 percent.

A comparison of these results with that achieved by the catalyst obtained according to Example I clearly shows the significant advantages resulting from the use of the process according to this invention.

*Example IV*

A catalytic material is prepared by pulverizing 10 kilograms of the catalytic material obtained according to Example II, admixing the resulting powder to 10 kilograms of activated eta alumina, 2 kilograms of ammonium paramolybdate, 1.2 kilograms of hexahydrated cobalt nitrate and 8.5 kilograms of distilled water, and treating the so obtained mixture in the same manner as according to Example I.

The attrition of the resulting catalytic material amounts to 2.8 percent and its catalytic activity to 75 percent.

Example V

A catalytic material is prepared by pulverizing 4 kilograms of the catalytic material obtained according to Example I, admixing the resulting powder to 16 kilograms of activated eta alumina, 3.2 kilograms of ammonium paramolybdate, 1.92 kilograms of hexahydrated cobalt nitrate and 8.5 kilograms of distilled water, and treating the so obtained mixture in the same manner as according to Example I.

The attrition of the resulting catalytic material amounts to 3.3 percent and its catalytic activity to 79 percent. A comparison of these values to that of the catalyst according to Example I clearly demonstrates the superiority of the improved catalyst obtained according to the process of this invention.

Example VI

A catalyst is prepared by pulverizing 10 kilograms of the catalytic material obtained according to Example II, admixing the resulting powder to 10 kilograms of activated eta alumina, 2 kilograms of ammonium paramolybdate, 1.2 kilograms of hexahydrated cobalt nitrate and 8.5 kilograms of distilled water, and treating the so obtained mixture in the same manner as according to Example II.

The attrition of the catalyst, obtained in the form of balls, amounts to 0.9 percent and its catalytic activity to 77 percent. These results are clearly better than that obtained with the catalyst according to Example II and are therefore illustrative of the considerable improvement achieved by the process of the invention.

Example VII

A catalyst is prepared by pulverizing 20 kilograms of the catalytic material obtained according to Example II and agglomerating the resulting powder in the form of pills by means of 8.5 kilograms of distilled water. The resulting pills are thereafter subjected to the same treatments as according to Example II.

The attrition of the resulting catalyst obtained in the form of balls amounts to 1.2 percent and its catalytic activity to 73 percent.

A comparison of these results with that obtained according to Example II shows that the mere re-agglomeration of a pulverized conglomerate of the catalytic material on an alumina basis described in Example II provides for a significant increase of its catalytic activity.

Example VIII 15 kilograms of eta alumina are admixed with 14 kilograms of ferric nitrate having 9 molecules of water, in the form of ball-like pills. After an aging treatment in moist air for 24 hours at a temperature of 65° C. the balls, which have a diameter of from 3 to 5 millimeters, are dried and calcinated for 2 hours at 560° C. The attrition of the catalyst amounts to 6.5 percent.

These balls are pulverized and re-agglomerated, aged and calcinated in the same way as before. Their attrition is then reduced to 3.5 percent.

Example IX 10 kilograms of eta alumina are admixed with 4.5 liters of distilled water and formed by drawing as described in Example I. The resulting agglomerates are then maintained in moist air for 12 hours at 70° C., then dried and calcinated by heating at 590° C. for one hour.

The attrition of the thus obtained agglomerates amounts to 1.85 percent.

They are pulverized and the resulting powder is again formed, aged and calcinated as described above. The attrition of the agglomerates amounts only to 0.75 percent.

It must be understood that, while there have been given herein certain specific details of the carrying-out of this invention, it is not intended thereby to limit the same to such exemplified details since the latter may be varied according to individual preference or conditions without departing from the spirit of the present disclosure and the scope of the appended claims.

What we claim is:

1. A process for manufacturing alumina base catalytic conglomerates exhibiting improved catalytic activity and improved resistance to attrition, comprising the successive steps of—
   (a) agglomerating powdered alumina-containing catalyst constituents;
   (b) ageing the resulting conglomerates in moist air at less than about 150° C.;
   (c) calcinating the aged conglomerates at about 300–700° C.;
   (d) pulverizing the calcinated conglomerates to form a powder;
   (e) agglomerating said powder;
   (f) ageing at less than about 150° C. the conglomerates resulting from step (e); and
   (g) calcinating the resulting aged conglomerates at about 300–700° C.

2. A process for manufacturing alumina base catalytic conglomerates exhibiting improved catalytic activity and improved resistance to attrition, comprising the successive steps of—
   (a) agglomerating powdered alumina-containing catalyst constituents;
   (b) ageing the resulting conglomerates in moist air at less than about 150° C.;
   (c) calcinating the aged conglomerates at about 300–700° C.;
   (d) pulverizing the calcinated conglomerates to form a powder;
   (e) mixing a portion of the pulverized calcinated conglomerate of step (d) with powdered alumina-containing catalyst constituents;
   (f) agglomerating the pulverized and powdered mixture of step (e);
   (g) ageing the resulting conglomerates in moist air at less than about 150° C.; and
   (h) calcinating the aged conglomerates of step (g) at about 300–700° C.

3. A process for manufacturing alumina conglomerates exhibiting improved resistance to attrition, comprising the sucessive steps of—
   (a) agglomerating powdered alumina;
   (b) ageing the resulting conglomerates in moist air at less than about 150° C.;
   (c) calcinating the aged conglomerates at about 300–700° C.;
   (d) pulverizing the calcinated conglomerates to form a powder;
   (e) mixing a portion of the pulverized calcinated conglomerate of step (d) with powdered alumina;
   (f) agglomerating the pulverized and powdered mixture of step (e);
   (g) ageing the resulting conglomerates in moist air at less than about 150° C.; and
   (h) calcinating the aged conglomerates of step (g) at about 300–700° C.

4. A process for manufacturing alumina base catalytic conglomerates exhibiting improved catalytic activity and improved resistance to attrition, comprising the successive steps of—
   (a) agglomerating powdered alumina-containing catalyst constituents;
   (b) ageing the resulting conglomerates in moist air at less than about 150° C.;
   (c) calcinating the aged conglomerates at about 300–700° C.;
   (d) pulverizing the calcinated conglomerates to form a powder;
   (e) mixing a portion of the pulverized calcinated conglomerate of step (d) with alumina and a material selected from the group consisting of salts of thiomolybdates, thiotungstates, vanadates, tungstates, molybdates, cobalt, nickel, iron, zinc, and mixtures thereof;

(f) agglomerating the mixture of step (e);

(g) ageing the resulting conglomerates in moist air at less than about 150° C.; and (h) calcinating the aged conglomerates of step (g) at about 300–700° C.

5. The process of claim 2, wherein the portion of the pulverized calcinated conglomerate mixed in step (e) is 2 to 50%.

6. The product according to the process of claim 2.

References Cited by the Examiner
UNITED STATES PATENTS

| | | |
|---|---|---|
| 2,729,855 | 1/56 | Titus et al. _____ 252—455 X |
| 2,881,051 | 4/59 | Pingard _____ 23—143 |
| 2,938,002 | 5/60 | Keith et al. _____ 252—465 X |
| 3,002,935 | 10/61 | Pitzer _____ 252—465 X |

MAURICE A. BRINDISI, *Primary Examiner.*

JULIUS GREENWALD, BENJAMIN HENKIN, *Examiners.*